United States Patent
Karnik et al.

(10) Patent No.: US 9,106,611 B2
(45) Date of Patent: Aug. 11, 2015

(54) METHOD FOR EFFICIENT MESSAGE VERIFICATION ON RESOURCE-CONSTRAINED PLATFORMS FOR REAL-TIME TRACKING APPLICATIONS

(75) Inventors: Aditya R Karnik, Bangalore (IN); Aravind V. Iyer, Bangalore (IN); Bhargav R. Bellur, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 657 days.

(21) Appl. No.: 13/534,329

(22) Filed: Jun. 27, 2012

(65) Prior Publication Data
US 2014/0006615 A1    Jan. 2, 2014

(51) Int. Cl.
*G06F 15/16* (2006.01)
*H04L 29/06* (2006.01)
*H04L 12/861* (2013.01)

(52) U.S. Cl.
CPC ........ *H04L 63/0227* (2013.01); *H04L 63/1441* (2013.01); *H04L 49/9047* (2013.01)

(58) Field of Classification Search
None
See application file for complete search history.

(56) References Cited

U.S. PATENT DOCUMENTS

| | | | |
|---|---|---|---|
| 2006/0123479 A1* | 6/2006 | Kumar et al. | 726/23 |
| 2009/0254754 A1* | 10/2009 | Bellur et al. | 713/176 |
| 2011/0154443 A1* | 6/2011 | Thakur et al. | 726/3 |
| 2011/0238997 A1* | 9/2011 | Bellur et al. | 713/176 |
| 2011/0304425 A1* | 12/2011 | Iyer et al. | 340/5.8 |

* cited by examiner

*Primary Examiner* — Hassan Kizou
*Assistant Examiner* — Hashim Bhatti (57) ABSTRACT

A method is provided for processing packets in a security module of a node in a real-time tracking system. The security module receives messages via a communication module. Each message contains an identifier associated with a transmitting entity of the message. A respective identifier is associated with a respective buffer. Messages having a same identifier are stored to an associated buffer. At least one message is selected from each buffer. For each buffer, a verification mode is selected for the message selected based on state variables and identifier-level properties of the identifier associated with that buffer. A buffer for message verification is selected based on state variables and identifier-level properties of all identifiers. The message selected is verified utilizing the selected verification mode. The state variables and the identifier-level properties of all identifiers are updated based on a result of the verification of the at least one message.

24 Claims, 3 Drawing Sheets

METHOD FOR EFFICIENT MESSAGE VERIFICATION ON RESOURCE-CONSTRAINED PLATFORMS FOR REAL-TIME TRACKING APPLICATIONS

BACKGROUND OF INVENTION

An embodiment relates generally to security processing of message communications for a real-time tracking system.

A real-time tracking system consists of a number of nodes which process information about one or more time-varying or spatially varying random processes, in order to execute a given task. The nodes sample and track the processes of interest, by mutually exchanging sampled data in the form of messages. These messages are transmitted over channels that may be unreliable and hostile. Messages transmitted over unreliable channels may be lost, so that only a fraction of the transmitted messages may get through to the intended destination node. A hostile channel is one to which a malicious entity may have access, and could insert malicious messages. Nodes in such systems may have limited computational and storage resources. Given such constraints as described above, the nodes in a real-time tracking system need to process the exchanged messages so as to facilitate the execution of the underlying task of the system. Thus, the primary interest is in the satisfactory completion of that task. Performance requirements of the system essentially stem from what constitutes satisfactory completion. Randomness is inherent in these systems due to randomness in the processes being monitored or it could arise due to measurement errors and/or unreliable communication. This means that performance guarantees can only be of a probabilistic nature.

One example is a vehicle-to-vehicle (V2V) communication system to assist drivers of the vehicle. In vehicle-to-vehicle communications (V2V), vehicles are equipped with wireless radio interfaces which they use to communicate with one another. An objective of a V2V network is to enable driver assistance safety applications such as emergency electronic brake light (EEBL) or blind spot warning (BSW) applications. V2V safety applications rely on wireless communications for exchanging useful information that pertains to driving conditions. Exchanged information relied upon includes kinematical information (e.g., the motion of objects without consideration of the forces producing the motion such as mass and force), road condition information, and even traffic information. The information is processed to determine whether warnings or advisories should be conveyed to the driver of the vehicle to enable the driver to make appropriate driving maneuvers. Drivers are expected to make use of the warnings/advisories and act upon such warnings/advisories received from the V2V system, in a similar manner as reacting to turn signals or brake lights of cars ahead of them, or warning signals displayed on a side of the road. As a result, it is imperative to ensure the integrity/correctness of the information exchanged and provided to the driver by the V2V system.

Another example is that of sensor networking for real-time tracking of a signal of interest. Examples of such a system include remote monitoring of server farms using a sensor network, monitoring and/or controlling industrial automation and environmental monitoring. In each of these examples, a central monitor or controller receives messages pertaining to several signals of interest. The controller's responsibility is to track received signals in real-time to maintain correct operation of the underlying system and prevention of malfunctions. In systems where wireless sensors are used, it is necessary to use authentication to transmit messages among system entities (sensors and controller(s)). These systems also need to make judicious use of their resources so that the controller is able to maintain the system performance at the acceptable level.

The traditional network security approach to verify the transmitted information is to append signatures or authentication tags to each message that is exchanged over the hostile and/or unreliable channel, and use only those messages for further processing whose signature or authentication tags is valid. A message with a valid authentication tag is called a genuine message, while one with an invalid authentication tag is called a bogus message. Network security algorithms or specifically authentication schemes provide a verifying node with multiple ways ("modes") to verify a received message. Under any authentication scheme, the following three (trivial) modes are available: accepting the message after verification, discarding the message before verification, or accepting the message without verification. Additional modes may arise in multiple authenticator schemes where messages may be appended with more than one authentication tag, any one of which can undergo verification. While the use of authentication schemes can ensure the authenticity of the information that safety applications act upon, it leaves opens the issue of how an entity is expected to authenticate and process messages given its limited computational resources.

An example of a current approach that addresses the above issue is the first-in first-out approach. But first-in-first-out fails to account for the urgency of the data being authenticated. Another approach is called "Verify-on-demand" whereby the tracking application demands verification of specific messages. Now while this may meet the performance requirements of the system, it is not clear whether all the demanded verifications would be feasible or not. Further, it is the history of messages rather than the "specific one" that might actually be essential for certain predictive tasks such as determining whether or not a vehicular collision is imminent. Also, the strategy still leaves open the question of what if the specific message that is verified turns out to be bogus (i.e., fails verification of its authentication tag). In other approaches such as assigning deadlines to messages, it is not clear whether the assigned deadlines are feasible. Even deadline assignment focuses on individual messages rather than their history. These approaches may also lead to exploitation by attackers crafting bogus messages that would attract urgent deadlines.

Given a node in a real-time tracking system with a limited amount of computational resources, it may not be able to track all its signals-of-interest with equally high accuracy. The processing strategies and the security layer need to work with the limited amount of storage and computational capability that is available. Specifically, it may be necessary for the node to assign priorities to its signals-of-interest depending on how they affect the underlying mission or task of the real-time system. Since messages may be exchanged over unreliable channels, the processing strategies and the security layer need to be sensitive to the availability or lack of information from respective sending nodes. Finally, the processing strategy and security layer needs to be resilient to computational Denial-of-Service (DoS) attacks whereby its resources may be overwhelmed by processing bogus packets.

The processing strategy and the security layer need to balance all of the above mentioned factors, and while doing so evaluate all the authentication modes available with all the messages pertaining to all the signals that are being tracked. However, crafting strategies that are optimal with respect to the entire domain of selections may be too cumbersome to implement, and may end up with very little robustness to the changing environment.

SUMMARY OF INVENTION

An advantage of the embodiment described herein is the Adaptive Security Processing Module which is capable of meeting the performance requirements of the real-time tracking task while making efficient use of the constrained resources of the system. The adaptive security processing module explicitly encapsulates real-time tracking requirements in terms of priorities, and encapsulates resource-constraints in terms of costs. The adaptive security processing module adaptively selects messages for verification that would result in great improvement in tracking, while consuming a low amount of resources.

The adaptive security processing module selects authentication modes and schedules messages for verification. The selection is a function of priorities set forth by a tracking application module, as a function of a communication reliability of various signals, as a function of a likelihood that a message corresponding to a signal is genuine as determined by the adaptive security processing module. These three parameters are specific to a signal identifier and are referred to as identifier-level properties. The selection is also a function of the state of the environment which is captured in terms of state variables. Such decisions are executed by balancing all verification modes of all messages corresponding to all signals of interest. Therefore, packets emanating from each different cryptographic credential are treated as distinct packet streams. Each stream is first examined in isolation to assess the respective packet that would be the best in terms of getting tracking information pertaining to a respective stream by identifying the packet and the mode of authentication. Thereafter a choice is made across all packet streams to select which respective packet should be verified by a security scheduler that would result in the most critical signal information becoming available. After the selected packet is verified, the state variables and identifier-level properties are updated accordingly and the above process resumes to select the next packet An embodiment contemplates a method for processing packets in a security module of a node in a real-time tracking system. The security module receives messages from a transmitting entity via a communication module and passes verified messages to a tracking application module. The communication module receives a plurality of messages. Each message contains an identifier associated with the transmitting entity of the message. A respective identifier is associated with a respective buffer. Messages having a same identifier are stored to an associated buffer. Memory space is allocated to the various buffers. At least one message is selected from each buffer. For each buffer, a verification mode is selected for the selected at least one message based on state variables and identifier-level properties of the identifier associated with that buffer. A buffer for message verification is selected based on state variables and identifier-level properties of all identifiers. The selected at least one message from the selected buffer is verified utilizing the selected verification mode. The state variables and the identifier-level properties of all identifiers are updated based on a result of the verification of the at least one message.

DETAILED DESCRIPTION

Figure 1:
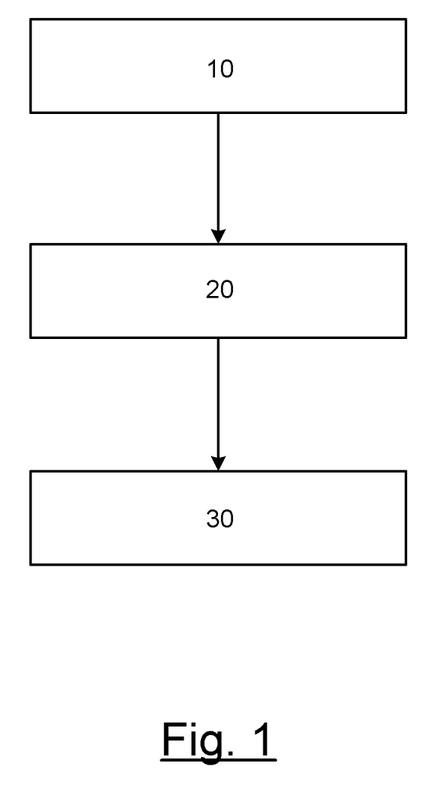
FIG. 1 is a block diagram of packet processing modules in a receiver for secure communications according to an embodiment of the invention.

There is shown in FIG. 1 a block diagram of a receiver that includes packet processing modules for secure communications. A communication module 10 provides addressing and channel control mechanisms that allow communication within a multi-point network. The communication module 10 focuses on streamlining and selecting messages received on the communication interface for further processing (e.g., as per the DSRC (Dedicated Short-Range Communications) standard). The decision as to whether received messages are forwarded for security processing from the communication module 10 is not discussed in detail herein and the process can be performed by any known processing standards (e.g., DSRC).

After receiving messages that are forwarded from the communication module 10 for security processing, an adaptive security processing module 20 determines how various functionalities associated with security processing can be scheduled. Within the adaptive security processing module 20, a broadcast authentication scheme is implemented that specifies a verification process. Authentication is a protocol whereby a sender appends a signature or authentication tag to a message that it sends, and a receiver or receivers interested in that message verify the signature or authentication tag of that message. A respective verification process can be carried out by one or more modes of operation.

A tracking application module 30 tracks signals of interest as appropriate to the underlying task of the real-time tracking system. The tracking application module 30 assigns different priority levels to different signals and tracks them only to a level of accuracy merited by their respective corresponding priority level. The tracking application module 30 also provides feedback to the adaptive security processing module 20 to let it know the priorities of the various signals being tracked.

Figure 2:
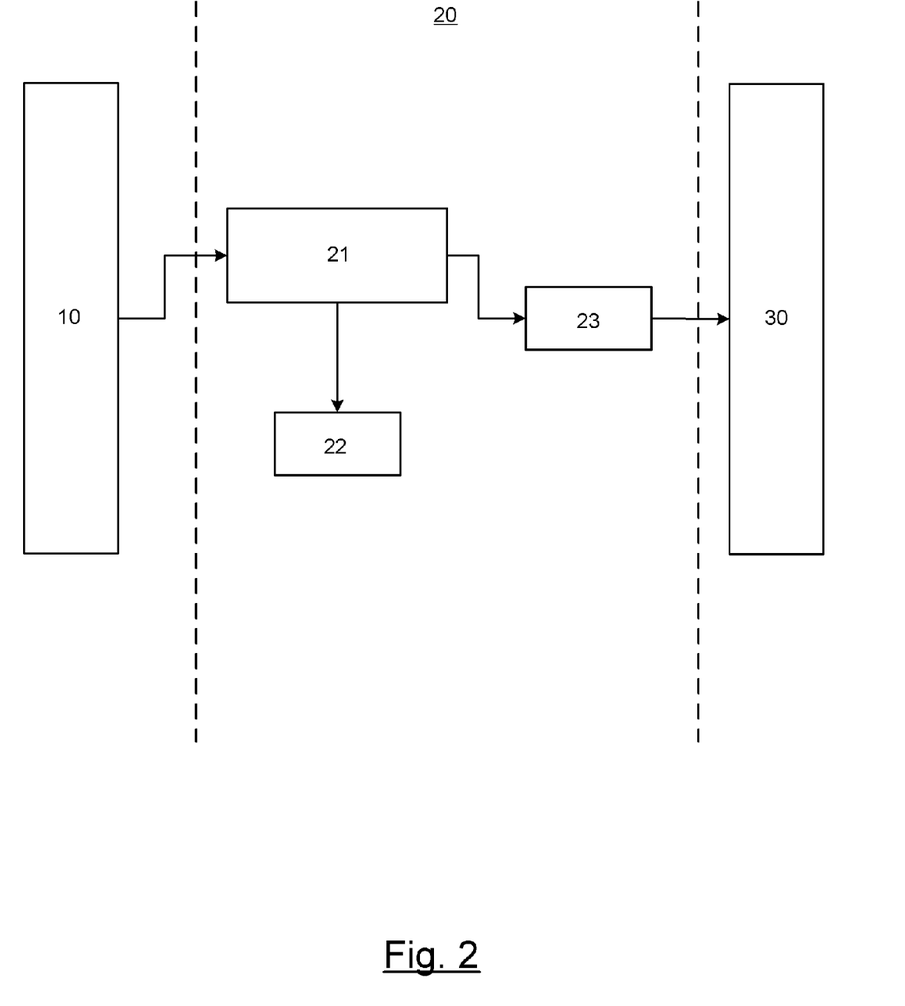
FIG. 2 is a block diagram of an adaptive security processing module according to an embodiment of the invention.

FIG. 2 is a block diagram of the adaptive security processing module 20. It should be understood that the solid lines shown in FIG. 2 represent an exchange of communication data and/or processing of communication data, whereas the dotted lines represent an exchange of control information. The adaptive security processing module 20 includes a memory 21 for receiving incoming messages 19 from the communication module 10. The received messages are stored in the memory 21 awaiting processing. A memory manager 22 performs decision making operations for classifying messages, allocating memory space, and prioritizing (i.e., ordering) messages. A processor 23 performs decision making operations for selecting messages for authentication from all available messages and for selecting a corresponding authentication mode to use for authentication of the selected message. The processor carries out the actual verification process and forwards authenticated messages to the tracking application module 30.

Figure 3:
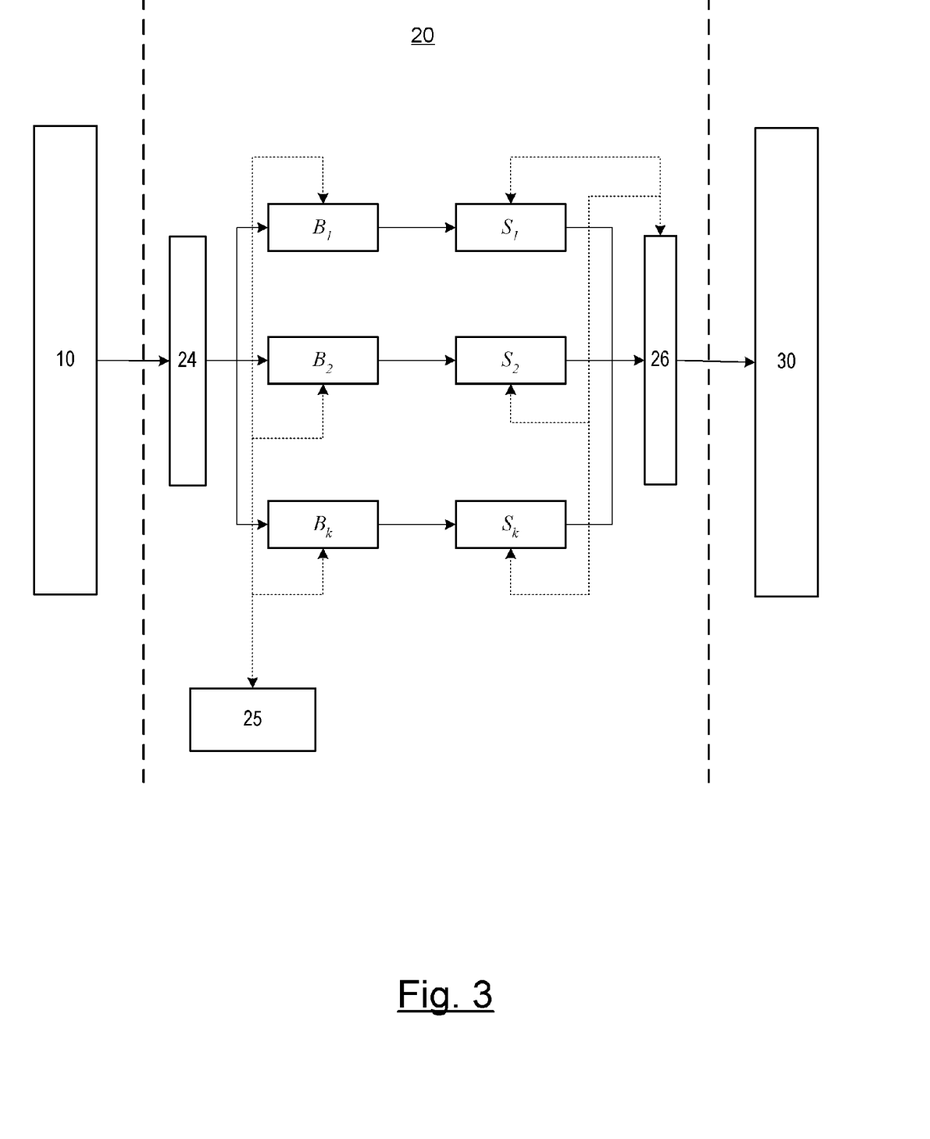
FIG. 3 is an enhanced block diagram of an adaptive security processing module according to an embodiment of the invention.

FIG. 3 shows a more detailed description of the block diagram of the adaptive security processing module 20. The memory manager 22 (as shown in FIG. 2) is divided into a message classifier 24 and a memory allocator 25. The message classifier 24 classifies the messages into streams depending on an identifier associated with each message. The received messages are classified based on their respective cryptographic credentials. The cryptographic credentials may include, but are not limited to, a digital certificate, credential key, an anonymous digital certificate, or a pseudonym.

The memory allocator 25 divides the overall memory into a plurality of buffers $B_1, B_2, \ldots, B_k$. Here k represents the number of distinct identifiers being tracked. The approach of storing messages having a same identifier in an associated buffer is resilient to message losses since multiple messages from a same identifier may be redundant or the same. Storage of messages from a same identifier in a designated buffer provides better predictive capability with the possibility of reduced processing since authenticating a message may obviate a need to do the same for other messages. This approach also enables priorities of the tracking application module to be incorporated in security processing (e.g., in V2V systems, message streams from closer vehicles may be given precedence). Moreover, by combining the modes available in authentication schemes with knowledge of previous outcomes of the verification of messages from a particular identifier allows us to achieve efficiency in the overall verification process. In particular, a stream with a history of a large percentage of bogus messages can be given only a fraction of resources, therefore countering computational denial of service attacks.

The segregation of messages based on their identifiers enables the definition and the use of identifier-level properties. These identifier-level properties include (i) the priorities of the signals of interest as dictated by the tracking application module 30; (ii) the communication reliability of receiving messages corresponding to particular identifiers as estimated by the communication module 10; and (iii) the belief of the adaptive security processing module 20 relating to a potential of success of the verification process. The belief may be captured through a probability of receiving a bogus message (or fraction of bogus messages received). It can also be represented in a more sophisticated manner by a probability distribution on the maliciousness of the streams (e.g., probability distribution on {0,1} where "0" codes a malicious state and "1" codes a bona fide state). These identifier-level properties may be static or they could change with time. They may possibly have different values for different identifiers.

Owing to the processing and memory allocation decisions of the node, and due to message arrivals, various quantities such as the number of unprocessed messages in the various buffers, the available memory space, the time differences between the last time a buffer was processed and the time of latest message arrival in that buffer, and so forth, change with time. A state variable is a variable that keeps track of one of the above quantities. In addition to the identifier-level properties discussed above, a node maintains several state variables to be used by the adaptive security processing module 30. The state variables include, but are not limited to, a number of unprocessed messages in various buffers, payload information in unprocessed messages such as the time of creation of the message, a signal value recorded in the message. The term signal value is refers to the sampled value or values of the random process or processes, respectively, being tracked by the given node in the real-time tracking system.

The processor 23 (shown in FIG. 2) determines which messages are to be authenticated and which authentication mode to use for authentication. These decisions need to be executed by taking into account all authentication options of all packets from all identifiers. The two decisions are decoupled in contrast to the prior art techniques as follows. Each buffer is first examined in isolation to select the message or messages that would be the best in terms of getting tracking information pertaining to the respective stream and an authentication mode to authenticate them with. Thereafter a choice is made across all buffers to select one buffer, the selected message or messages from which would result in the most critical tracking information becoming available to the tracking application module 30. This is accomplished by the processor 23 being divided into a scheduler 26 and a plurality of mode selectors $S_1, S_2, \ldots, S_k$. Each mode selector selects a message or messages from its associated buffer and determines which authentication mode should be used to authenticate the selected message or messages. The scheduler 26 selects a buffer from among all the buffers, and authenticates the respective message or messages, using the authentication mode selected by the associated mode selector, and forwards the authenticated message to the tracking application module 30.

The memory allocator 25 is implemented as follows. Buffers $B_1, B_2, \ldots, B_k$ are utilized in the memory to receive the incoming messages and output the messages for security processing. Each identifier is assigned a segregated buffer space. The buffer space allocation is based on identifier level properties defined above. A queuing strategy determines the order in which messages are selected by the mode selectors. Various techniques may be used to queue messages including, but not limited to, first-in-first-out (FIFO) and last-in-first-out (LIFO).

Two methods are possible for performing the decision of the scheduler 26, namely, processor sharing and index-based scheduling. Processor sharing is a process where each identifier is assigned a weight (e.g., weighting factor) that determines its time-share on the processor. Weights are dynamically based on identifier-level properties, and state variables. Index-based scheduling is a method where at each instance that a decision is rendered, a scalar-type index is determined for each identifier. In index-based scheduling, the processor is allocated to an identifier having a highest index for verification. Calculation of an index of an identifier is based on identifier-level properties and state variables. Two examples of specific algorithms for index-based scheduling will be discussed in detail later.

The mode selectors $S_1, S_2, \ldots, S_k$ are implemented as follows. Messages in various buffers $B_1, B_2, \ldots, B_k$ would be appended with one or more authentication tags as per the underlying broadcast authentication schemes, and would have a number of modes of verification. The broadcast authentication schemes are not selected by the technique described herein; rather it is assumed that a broadcast authentication scheme is being used by the real-time tracking system. The technique described herein selects only the modes. The specifics of the mode selection process depend on the broadcast authentication scheme being used.

Each mode of verification is characterized by its performance dimensions. Examples of performance dimensions include but are not limited to verification time, precision of information, loss of information upon discarding, load on resources, and vulnerability. In order to take into account the performance of a verification mode, a cost is associated with that mode so that different modes can be compared across various performance dimensions. The cost of a verification mode is a scalar that is a function of the associated performance dimensions. For example, the cost may be a function of the verification time, the precision of the information if the verification being considered is successful, the loss of the information if the message is simply discarded, and the load on the resources of the security module. The decision of mode selection is arrived at by comparing costs across different modes for the messages under consideration, and by taking into account the identifier-level properties and the state variables. The objective is to minimize the cost incurred. The messages under consideration would be the head-of-the-line message in accordance with the queuing policy described earlier. It should be noted that modes could also apply to a batch of messages rather than a single message, such as batch verification of ECDSA digital signatures where multiple messages may be verified at once, or discard of a batch of messages where those messages may be deleted without verification.

The above describes the overall functioning of the adaptive security processing module 20. The efficiency of the decisions of the adaptive security processing module 20 is achieved due to two distinct factors. First, by maintaining updated identifier-level properties about the transmitting entity, decisions can direct emphasis to the preferred signal of interest. The belief may be updated by observing the outcomes of the broadcast authentication mechanisms. External inputs, such as that from an external authority could be used to update a belief. Communication reliability is updated by keeping track of message loss rate corresponding to specific identifiers. The application level priorities are dictated by the priority of various signals of interest being tracked. Second, by learning from outcomes of past verifications, these decisions can keep pace with the changing environment. Each decision by the scheduler results in a verification process. Upon successful verification, the authenticated message is passed on to the tracking application module 30. If the verification fails, the message is discarded. In both cases, the identifier-level properties for that identifier and applicable state variables are continually updated. In the following, two specific algorithms are described for adaptive security processing.

The following is a description of an algorithm for a classical layered approach. In the classical layered approach, the adaptive security processing module 20 functions independently of the tracking application module 30. The tracking application module 30 only notifies the priorities of different signals to the adaptive security processing module 20. The classical layer approach is constructed in a way to minimize the delay messages encounter in waiting for verification, while being resilient to both computational and memory denial of service attacks.

Memory allocator 25 has two possible implementations. A finite buffer space is allocated for each stream where the buffer space allocation is a function of identifier-level properties. The following are two possible selections for queuing messages within the buffer. The first example can be first-in-first-out (FIFO) with tail drop. That is, messages are placed in a buffer and placed in the order of their arrival. Incoming messages that find the buffer full are dropped. The second example can be a FIFO with arbitrary drop. Messages are placed in the buffer and placed in order of their arrival. If the buffer is full when a new message arrives, any random message within the buffer, including the new one, is dropped to create space. The arbitrary selection of messages is performed to minimize loss of information.

Mode selectors $S_1, S_2, \ldots, S_k$ have an implementation that is specific to a fixed broadcast authentication scheme. An assumption is made that all messages are being authenticated using the same broadcast authentication scheme. The following description is a mode selection process for some example schemes. For ECDSA a single mode is utilized for the verification of the digital signature. For TADS two modes are considered, specifically, verification of a TESLA MAC and verification of a digital signature. The mode selection process is the following: if there are any messages with an available TESLA key, such messages (called TESLA-enabled messages) are processed by verifying their TESLA MAC, otherwise the digital signature is verified. For Frugal Authentication, four modes are considered corresponding to four different precision levels. An assumption is made that modes are arranged and numbered in order of decreasing precision. The broadcast authentication mode is determined as a function of the queue-length n(t). The parameter (t) is a typical decision point and is indexed t=1, 2, 3, . . . , k The mode selection process is as follows:

(a) choose three integer thresholds $1 \leq b_1 \leq b_2 \leq b_3 \leq B$ where B is the buffer size;

(b) associate mode 1 with interval $[1,b_1]$, mode 2 with interval $[b_1+1,b_2]$, mode 3 with interval $[b_2+1,b_3]$, mode 4 with interval $[b_3+1, b_4]$ (c) choose the mode corresponding to the interval in which n(t) is disposed.

The scheduler 26 is implemented as follows as an index-based scheduler. For each stream (i), an index is calculated as:

$$w_i h_i(m_i(t)-v_i(t))-Cq_i(t).$$

where $w_i$ is the priority of stream i assigned by the tracking application module 30 (smaller value indicates higher priority), $h_i$ is a cost of buffer resources for stream i (holding cost), $m_i(t)$ is a number of messages considered for deletion at stream i at time t, $v_i(t)$ is a number of messages that can be verified at stream i at time t, C is a cost of wasting processing resources, and $q_i(t)$ is a fraction of genuine messages received in stream i until time t (belief parameter).

At decision instant (t), the scheduler assigns the processor to the stream having the lowest index for verification. For the other streams, the scheduler performs a batch deletion of some messages as described next. There are four steps at each decision instant (t). Each of the steps is described in the following paragraphs. Any aspect of the following steps which is specific to the broadcast authentication scheme being used is pointed out as such.

First, a determination is made as to a certain number of messages considered for deletion at each stream (i). This number $m_i(t)$ is chosen randomly from $0 \leq m_i(t) \leq L \leq n_i(t)$, where L is a chosen parameter. The probability distribution of $m_i(t)$ is parameterized by the queue-length parameter $n_i(t)$ and the belief parameter $q_i(t)$ such that (1) if $n_i^1(t) \leq n_i^2(t)$, then the distribution with value $n_i^2$ stochastically dominates the one with $n_i^1$; (2) if $q_i^1(t) \leq q_i^2(t)$, then the distribution with value $q_i^1$ stochastically dominates the one with $q_i^2$. Exactly which messages are considered for deletion is left open for implementation.

Second, a determination is made as to the number of messages to verify. The number of messages that can be verified at a decision instant v(t) is specific to the broadcast authentication scheme and the time slot allocated on the processor for the task of verification. If the allocated time slot corresponds to the verification time of one digital signature then for ECDSA and TADS, $v_i(t)$ equals 1. For TADS, TESLA-enabled messages are always verified leaving messages with digital signature in contention for the processor slot. In the example of Frugal Authentication, $v_i(t)$ is automatically determined from the mode selected as follows: $v_i(t)$ is the ratio of the time slot allocated on the processor to the verification time corresponding to the chosen mode.

Third, a determination is made as to which stream is selected for verification. For each stream (i), an index is calculated as $w_i h_i(m_i(t)-v_i(t))-Cq_i(t)$. The stream that has the minimum value for the index is found. If more than one stream has the minimum value, then a stream is chosen randomly between those streams having the minimum value. A chosen stream is labeled j. For the chosen stream (j), the processor is allocated to stream (j) for verification and $v_j(t)$ messages are verified. For the other streams, $m_i(t)$ messages are deleted from their buffers.

Fourth, the belief parameter is updated for only the chosen stream whose messages were verified. Let $\overline{m}_j(t)$ be the fraction of genuine messages verified from (j) in the allocated time corresponding to decision time (t). The belief parameter is represented as follows:

$$q_j(t+1)=\alpha(t)q_j(t)+(1-\alpha(t))\overline{m}_j(t),$$

where $0\leq\alpha(t)\leq1$ and $\alpha(t)\uparrow 1$. Queue lengths are updated for each stream by counting the number of messages.

The following is a description of an algorithm for a cross-layer approach. In the cross-layer approach, the security layer caters to specific objectives of the tracking application module 30. The tracking application module 30 notifies priorities and objective values to the adaptive security processing module 20. The cross-layer approach attempts to directly minimize the error in the estimates of the signals of interest being tracked by prioritizing messages arrived latest.

The memory allocator implementation is similar to that described in the classical layered approach, namely, a finite buffer is allocated for each stream in proportion to its identifier-level properties. But for queuing, a last-in-first-out (LIFO) technique is utilized where messages are placed and processed in a reverse order of their arrival. If new messages find the buffer full, then older messages are lost. This approach is used in contrast to that for the classical layered approach to directly prioritize latest messages.

The mode selection process is implemented as follows and is specific to the broadcast authentication scheme. For ECDSA a single mode is considered which is the verification of the digital signature. For TADS two modes are considered, specifically, verification of a TESLA MAC and verification of a digital signature. The mode selection process is the following: if there are any messages with an available TESLA key, such messages (called TESLA-enabled messages) are processed by verifying their TESLA MAC, otherwise the digital signature is verified. For Frugal Authentication, four modes are considered corresponding to four different precision levels. An assumption is made that modes are arranged and numbered in order of decreasing precision. The broadcast authentication mode is determined as a function of the belief parameter q(t). The process is as follows:

(a) choose three integer thresholds $0\leq Q_1\leq Q_2\leq Q_3\leq 1$;
(b) associate mode 1 with interval $[0, Q_1]$, mode 2 with interval $[Q_1, Q_2]$, mode 3 with interval $[Q_2, Q_3]$, mode 4 with interval $[Q_3, 1]$;
(c) choose the mode corresponding to the interval in which q(t) is disposed.

The scheduler 26 is implemented as follows. For each stream (i), an index is calculated as:

$$\frac{w_i s_i \sigma_i^2 q_i}{p_i}$$

where $w_i$ is the tracking application level priority of stream i (higher value indicates higher priority), $s_i$ is a time lag $l_i-m_i$ of stream i, $l_i$ is a time-stamp of the head-of-the-line message in buffer i, $m_i$ is a time-stamp of the last genuine message verified from stream i, $\sigma_i$ is a measure of stochastic variability in the process corresponding to stream i estimated by tracking application module 30. $p_i$ is the reception rate of messages corresponding to stream i (communication reliability estimated by communication module 10) and $q_i$ is the belief parameter for buffer i.

At decision instant (t), the processor is assigned to the stream having the largest index for verification. There are three steps at each decision instant (t) and are described in the following paragraphs.

First, the stream for verification is determined. The stream having the largest value of index $$\frac{w_i s_i \sigma_i^2 q_i}{p_i}$$

is selected for verification. A selected stream is labeled j.

Second, the head-of-the-line message of the stream (j) is verified according to the selected authentication mode. If the message of the selected stream is genuine, signifying that the message has passed broadcast authentication, then the message is passed to the tracking application module 30 for additional processing and all other messages in the buffer (j) are discarded. Messages in all other buffers remain untouched.

Third, the parameter belief is updated for only the selected stream from which messages were verified. Let $\overline{m}_j(t)$ be the fraction of genuine messages verified from (j) in the time slice corresponding to decision time (t). Then $q_j(t+1)=\alpha(t)q_j(t)+(1-\alpha(t))\overline{m}_j(t)$, where $0\leq\alpha(t)\leq1$ and $\alpha(t)\uparrow 1$. For each stream (i), $s_i$ is updated upon arrival of the message. Estimation and update of $\sigma_i^2$ is assumed to be provided by the tracking application module 30. $p_i$ is estimated from the prescribed message generation rate and actual arrival rate. For example, in V2V systems, the prescribed message generation rate is 1 per 100 ms. Estimate of $p_i$ at time (t) is then the fraction of messages received till decision instant (t).

The following are examples and descriptions of the broadcast authentication schemes described earlier that may be used with the techniques described herein. ECDSA (Elliptic Curve Digital Signature Algorithm) is an asymmetric key cryptography based digital signature algorithm. Security in ECDSA is based upon the hardness of computing discrete logarithms in elliptic curve groups. It requires lower key sizes as compared to signature algorithms like RSA (Rivest, Shamir and Adleman), for the same level of security. Therefore, ECDSA has a lower communication overhead as compared to RSA. ECDSA utilizes two keys, a private key that is held privately by the signer, and a public key that is certified by a PKI and distributed to the intended recipients of signed messages from the signer. When utilizing ECDSA, the signer employs the hash-and-sign paradigm to sign messages. Specifically, the signer computes the hash of a given message using a cryptographic one-way hash function, to produce a message digest. The message digest is subsequently signed using the private key, to produce a signature. The given message concatenated with the signature represents a signed message. A receiver wishing to verify the signature on the message, also hashes the message to compute the message digest, and subsequently executes a verification algorithm using the message digest, the signature transmitted with the message and the public key of the signer. The result is a PASS or FAIL answer indicating whether the signature was valid or invalid. ECDSA has a fairly modest communication overhead; however, as is typical of asymmetric cryptography, ECDSA involves operations over extremely large integers from the underlying elliptic curve group. Therefore, ECDSA is computationally quite intensive.

TESLA Authentication and Digital Signatures (TADS) is a scheme that combines TESLA with ECDSA. TESLA (Timed Efficient Stream Loss-tolerant Authentication) makes use of symmetric key cryptography for broadcast authentication. Symmetric key cryptography involves operations which are computationally much less intensive as compared to those used in asymmetric key cryptography. Therefore, the generation and verification of the authentication tag in TESLA is about 4-5 orders of magnitude faster as compared to ECDSA signing and verification operations (i.e., on a generic processor). A TESLA authentication tag is known as a message authentication code (MAC). The TESLA MAC is a message digest but one which is also a function of a secret key. All entities who share possession of the secret key are able to create and verify the MAC corresponding to any message. Owing to this, MACs are not directly suitable for broadcast authentication, since it is impossible to distinguish whether a message was signed by a designated sender or just some entity inappropriately possessing the secret key. TESLA solves this problem as follows. Under TESLA, the sender first creates a commitment to a key by computing the hash of the key. This commitment is certified by a PKI and distributed to all the intended recipients. The sender then creates the MAC for a given message using the key which was committed to.

The message concatenated with the MAC is a TESLA signed message. The sender ensures that all intended recipients have indeed received the message. If the maximum communication delays in the network are bounded, this can be accomplished simply by the sender waiting for the corresponding bounded duration. Subsequently, the sender releases the actual key which was used to sign the given message. Receivers can similarly ascertain that the key has not been released at the time they receive the TESLA signed message. Subsequently, when the key is received, the TESLA MAC can be verified and authenticity and integrity of the message can be established. Thus, TESLA uses delayed key disclosure to derive asymmetry from a symmetric key based primitive, the MAC. However, owing to this construction, a TESLA signed message may not be immediately available for verification. Under TADS, a sender creates both an ECDSA signature and a TESLA MAC for a given message, and transmits the message concatenated with the digital signature and the TESLA MAC.

Conventional authentication schemes use the hash-and-sign paradigm to sign messages, whereby a message is first hashed (i.e., cryptographically converted into a fixed length string of bits) and subsequently, the signature is created on the message digest. It is not feasible to verify a message or a specific field in a message to only a limited level of precision. The receiver can either verify the entire message to its full precision, or not at all. Frugal Authentication algorithm enables a receiver to verify only as many bits of information pertaining to a field of its choice as it may deem appropriate.

Frugal Authentication works as follows. The sender while populating a message identifies all the fields which need to be authenticated frugally. The sender encodes each of these fields in such a way that even a subset of the bits representing a given field, would yield a valid but imprecise evaluation of the field. The larger the subset, the greater the precision, with the complete set of bits yielding the maximum precision. This process is called hierarchical encoding. The sender then groups these bits into several words (a word is a group of bits), and signs each word using a one-time signature algorithm such as the Merkle-Winternitz one-time signature. These one-time signatures are created in such a way that the authenticity of each word can be established independently of that of the other words. The set signatures are called hierarchical signatures. A signed message under Frugal Authentication is thus the given message with the relevant fields hierarchically encoded, concatenated with the hierarchical signatures of the different words. As in the earlier schemes, the public keys corresponding to the one-time signatures are generated by the sender ahead of creating the actual messages, and distributed to the intended recipients after certification from a PKI.

The example of Frugal Authentication described earlier employs four words to hierarchically encode each field in the message. These words are considered ordered according to their significance like the digits of a number. Thus, the most significant word with other words zeroed out constitutes a valid but imprecise representation of the number being encoded. The two most significant words with other words zeroed out improve the precision of the representation, as to the three most significant words with the fourth one zeroed out. All four words together constitute the exact number being encoded. Since each of these words can be authenticated independently of one another, four modes of verification arise. These are: (i) verify the most significant word; (ii) verify the two most significant words; (iii) verify the three most significant words; and (iv) verify all the words.

It should be understood that the broadcast authentication schemes described herein are only examples of broadcast authentication schemes that can be used.

While certain embodiments of the present invention have been described in detail, those familiar with the art to which this invention relates will recognize various alternative designs and embodiments for practicing the invention as defined by the following claims.

What is claimed is:

1. A method of processing packets in a security module of a node in a real-time tracking system, the security module receives messages from a transmitting entity via a communication module and passes verified messages to a tracking application module, the method comprising the steps of:
receiving via the communication module a plurality of messages, each message containing an identifier associated with the transmitting entity of the message;
associating a respective identifier with a respective buffer;
storing messages having a same identifier to an associated buffer;
allocating memory space to the various buffers;
selecting at least one message from each buffer;
for each buffer, selecting a verification mode for the selected at least one message based on state variables and identifier-level properties of the identifier associated with that buffer;
selecting a buffer for message verification based on state variables and identifier-level properties of all identifiers;
verifying the selected at least one message from the selected buffer utilizing the selected verification mode; and
updating the state variables and the identifier-level properties of all identifiers based on a result of the verification of the at least one message.

2. The method of claim 1 wherein the identifier-level property for an identifier includes a communication reliability that is a function of a message loss rate from the identifier.

3. The method of claim 1 wherein the identifier-level property for a respective identifier includes a belief parameter that is a function of a percentage of successful verifications of all verification attempts for the respective identifier.

4. The method of claim 1 wherein the identifier-level property for a respective identifier includes a tracking application priority specified by the tracking application module.

5. The method of claim 1 wherein the state variable of a respective node includes a number of unprocessed messages in each buffer.

6. The method of claim 1 wherein the state variable of a respective node includes time-stamps in each of the received messages.

7. The method of claim 1 wherein the state variable of a respective node includes a signal value in all the messages.

8. The method of claim 1 wherein adaptively selecting a verification mode is based on a cost associated with a verification process of the mode of the broadcast authentication scheme being utilized.

9. The method of claim 8 wherein the cost of the verification process is a function of a verification time of the mode.

10. The method of claim 8 wherein the cost of the verification process is a function of precision of a signal value in the message that the mode generates if the verification is successful.

11. The method of claim 8 wherein the cost of the verification process is a function of a loss of information resulting from discarding the message.

12. The method of claim 8 wherein the cost of the verification process is a function of a load on resources of the security module.

13. The method of claim 1 wherein an allocation of memory to a buffer is performed using identifier-level properties of the respective identifier associated with the buffer and the state variables.

14. The method of claim 1 wherein selecting a buffer for message verification includes allocation of a scheduler to each respective buffer using processor sharing, wherein a time allocation for a respective buffer is a time-fraction that is proportional to a weighting factor associated with the identifier for the respective buffer, and wherein the weighting factor being a function of identifier-level properties and state variables.

15. The method of claim 1 wherein selecting a buffer for message verification includes allocation of a scheduler to each respective buffer using index-based scheduling, wherein the scheduler is allocated to a respective buffer of a respective identifier having a highest index of available indexes to select from, and wherein the index is a function of identifier-level properties and state variables.

16. The method of claim 15 where the index is represented by the following factor:

$$w_i h_i(m_i(t)-v_i(t))-Cq_i(t).$$

where $w_i$ is an application-level priority of stream i, $h_i$ is a cost of buffer resources for stream i, $m_i(t)$ is a number of messages considered for deletion at stream i at time t, $v_i(t)$ is a number of messages that can be verified at stream i at time t, C is a cost of wasting processing resources, and $q_i(t)$ is a belief parameter that represents a fraction of genuine messages received in stream i until time t.

17. The method of claim 16 further comprising the step of determining a number of messages considered for deletion for each stream, the number of messages selected randomly from the following equation:

$$0 \leq m_i(t) \leq L \leq n_i(t),$$

where L is a chosen parameter; $m_i(t)$ is the number of messages considered for deletion, and $n_i(t)$ is a number of messages in the buffer at a given instant (t).

18. The method of claim 16 wherein the belief parameter is updated for a respective selected stream, wherein the updating the belief parameter is represented by the following formula:

$$q_j(t+1)=\alpha(t)q_j(t)+(1-\alpha(t))\overline{m}_j(t),$$

where $q_j(t+1)$ is the updated belief parameter; where $q_j(t)$ is the current belief parameter; $\overline{m}_j(t)$ is a fraction of genuine messages verified from (j) in an allocated time corresponding to decision time (t), and $\alpha(t)$ is a number in the range of $0<\alpha(t)\leq 1$.

19. The method of claim 16 wherein the number of messages $v_i(t)$ that can be verified at a respective stream at a respective time is based on a respective broadcast authentication scheme selected and a time slot allocated on the processor, wherein $v_i(t)$ is equal to 1 when at least one of an ECDSA or TADS broadcast scheme is selected, and wherein $v_i(t)$ is determined by a ratio of a time slot allocated on the processor to a verification time corresponding to the selected mode if a Frugal Authentication scheme is selected.

20. The method of claim 15 wherein the index is represented by the following formula:

$$\frac{w_i s_i \sigma_i^2 q_i}{p_i}$$

where $w_i$ is a tracking application level priority of stream i, $s_i$ is a time lag $l_i-m_i$ of stream i, $l_i$ is a time-stamp of a head-of-the-line message in buffer i, $m_i$ is a time-stamp of a last genuine message verified from stream i, $\sigma_i$ is a measure of stochastic variability in the process corresponding to stream i, $p_i$ is a reception rate of messages corresponding to stream i, and $q_i$ is a belief parameter for buffer i.

21. The method of claim 20 wherein the belief parameter is updated for a respective selected stream, wherein the updating the belief parameter is represented by the following formula:

$$q_j(t+1)=\alpha(t)q_j(t)+(1-\alpha(t))\overline{m}_j(t),$$

where $q_j(t+1)$ is an updated belief parameter; where $q_j(t)$ is a current belief parameter; $\overline{m}_j(t)$ is a fraction of genuine messages verified from (j) in an allocated time corresponding to decision time (t), and $\alpha(t)$ is a number in the range of $0<\alpha(t)\leq 1$.

22. The method of claim 1 wherein a broadcast authentication scheme used by the real-time tracking system includes at least one of ECSDA, TESLA, DSA, and Frugal Authentication.

23. The method of claim 22 wherein the Frugal Authentication scheme includes four modes of operation for verification, wherein each mode of operation is determined as a function a queue length, and wherein mode selection is based on the following steps:
    determining a queue length, the queue length being a number of messages in a buffer at a respective instant of time;
    arranging the modes in order of decreasing precision;
    choosing three integer thresholds represented by the equation $1 \leq b_1 \leq b_2 \leq b_3 \leq B$ where B is the buffer size, $[1,b_1]$ represents a first interval, $[b_1+1,b_2]$ represents a second interval $[b_2+1,b_3]$ represents a third interval, and $[b_3+1, b_4]$ represents a fourth interval;
    associating a first mode with interval $[1,b_1]$, a second mode with interval $[b_1+1,b_2]$, a third mode with interval $[b_2+1,b_3]$, and a fourth mode with interval $[b_3+1,b_4]$; and selecting one of the four modes corresponding to the respective interval in which the queue length is disposed.

24. The method of claim 22 wherein the Frugal Authentication scheme includes four modes of operation for verification, wherein each mode is determined as a function a belief parameter, and wherein mode selection is based on the following steps:

determining a belief parameter, the belief parameter being a fraction of genuine messages received in a stream until a predetermined time;

arranging the modes in order of decreasing precision;

choosing three integer thresholds represented by the equation $0 \leq Q_1 \leq Q_2 \leq Q_3 \leq 1$, where $[0,Q_1]$ represents a first interval, $[Q_1,Q_2]$ represents a second interval $[Q_2,Q_3]$ represents a third interval, and $[Q_3,1]$ represents a fourth interval;

associating a first mode with interval $[0, Q_1]$, a second mode with interval $[Q_1,Q_2]$, a third mode with interval $[Q_2,Q_3]$, and a fourth mode with interval $[Q_3,1]$; and selecting one of the four modes corresponding to the respective interval in which the belief parameter is disposed.

\* \* \* \* \*